(12) United States Patent
Ko et al.

(10) Patent No.: US 8,359,508 B2
(45) Date of Patent: Jan. 22, 2013

(54) METHOD AND APPARATUS FOR SELECTING RETRANSMISSION MODE IN A MIMO COMMUNICATION SYSTEM

(75) Inventors: Soo-Min Ko, Bucheon-si (KR); Han-Byul Seo, Seoul (KR); Byeong-Gi Lee, Seoul (KR); Eun-Yong Kim, Hwaseong-si (KR); Jong-Hyung Kwun, Seongnam-si (KR)

(73) Assignees: Samsung Electronics Co., Ltd, Suwon-Si (KR); Seoul National University Industry Foundation, Seoul (KR)

( * ) Notice: Subject to any disclaimer, the term of this patent is extended or adjusted under 35 U.S.C. 154(b) by 976 days.

(21) Appl. No.: 12/383,211

(22) Filed: Mar. 20, 2009

(65) Prior Publication Data

US 2009/0241002 A1 Sep. 24, 2009

(30) Foreign Application Priority Data

Mar. 20, 2008 (KR) .................. 10-2008-0026071

(51) Int. Cl.
*H04L 1/18* (2006.01)
(52) U.S. Cl. ..................................... 714/749
(58) Field of Classification Search .............. 714/749, 714/750, 748
See application file for complete search history.

(56) References Cited

U.S. PATENT DOCUMENTS

| | | | | |
|---|---|---|---|---|
| 2007/0255993 A1* | 11/2007 | Yap et al. | | 714/748 |
| 2008/0002621 A1* | 1/2008 | Ginzburg et al. | | 370/331 |
| 2008/0002790 A1* | 1/2008 | Itoh | | 375/317 |
| 2008/0244350 A1* | 10/2008 | de Carvalho et al. | | 714/748 |
| 2009/0241002 A1* | 9/2009 | Ko et al. | | 714/749 |
| 2010/0014601 A1* | 1/2010 | Mo et al. | | 375/260 |
| 2010/0058137 A1* | 3/2010 | Yokoyama | | 714/748 |

OTHER PUBLICATIONS

Eko N. Onggosanusi, et al.: "Hybrid ARQ Transmission and Combining for MIMO Systems", IEEE International Conference on Communications, vol. 26, No. 1, May, 2003, pp. 3205-3209.
Toshiaki Koike, et al.: "Hybrid ARQ Scheme Suitable for Coded MIMO Transmission", IEEE ICC 2004, Paris, Jun. 21, 2004, pp. 1-19.
Kodzovi Acolatse, et al.: "An Alamouti-based Hybrid-ARQ Scheme for MIMO Systems", Center for Communication and Signal Processing Research Department, New Jersey Institute of Technology University Heights, Newark, NJ 07102, 2005, 5 pages.

* cited by examiner

*Primary Examiner* — Joshua Lohn (57) ABSTRACT

A method and apparatus for selecting a retransmission mode in a MIMO communication system are provided wherein a receiver receives m initial transmission streams from a transmitter, m being an integer of 2 or larger, channel-decodes the m initial transmission streams and checking errors in the m channel-decoded streams, selects, if at least two channel-decoded streams have errors among the m channel-decoded streams, a retransmission mode to be used for the at least two streams having errors in the transmitter, and transmits information including the selected retransmission mode to the transmitter.

27 Claims, 7 Drawing Sheets

METHOD AND APPARATUS FOR SELECTING RETRANSMISSION MODE IN A MIMO COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Mar. 20, 2008 and assigned Serial No. 10-2008-0026071, the entire disclosure of which is hereby incorporated by reference.

TECHNICAL FIELD OF THE INVENTION

The present invention relates to a method and apparatus for selecting a retransmission mode in a Multiple Input Multiple Output (MIMO) communication system.

BACKGROUND OF THE INVENTION

Retransmission schemes have been proposed to increase the efficiency of Hybrid Automatic Repeat Request (HARQ) in a MIMO system.

One of the retransmission schemes is basis hopping that artificially provides time diversity to a channel in order to solve the problem of the decrease of HARQ gain on a slow fading channel.

Another retransmission scheme is Trellis-Coded Modulation (TCM) reallocation that reallocates a TCM code to multiple antennas at every retransmission.

A third retransmission scheme is antenna permutation that changes the mapping relation between a transmission stream and an antenna at every retransmission. The second and third retransmission schemes commonly provide time diversity to a slow fading channel.

The other retransmission scheme is to form an Alamouti Space Time Code (STC) by combining retransmission information with initial transmission information.

The first, second and third retransmission schemes aim to provide time diversity in a slow fading channel environment. Therefore, a desired performance improvement cannot be achieved in a fast fading channel environment already having time diversity.

The last retransmission scheme is based on the premise that a retransmission channel is almost constant to form an Alamouti STC with initial transmission information and retransmission information. A desired performance improvement can be achieved only in the slow fading channel environment.

However, in a real wireless communication environment, the channel environment mostly changes at every retransmission because of a time delay involved in signal processing and feedback. Moreover, if a channel is in deep fading status, it may be better to delay retransmission of erroneous information until the deep fading channel status is released. Accordingly, there exists a need for a new retransmission scheme adapted to various real channel environments in order to increase the efficiency of HARQ.

SUMMARY OF THE INVENTION

To address the above-discussed deficiencies of the prior art, it is a primary object of the present invention to address at least the problems and/or disadvantages and to provide at least the advantages described below. Accordingly, an aspect of exemplary embodiments of the present invention is to provide a method and apparatus for selecting a retransmission mode in a MIMO communication system.

In accordance with an aspect of exemplary embodiments of the present invention, there is provided a method for selecting a retransmission mode in a receiver of a MIMO communication system wherein the receiver receives m initial transmission streams from a transmitter, m being an integer of 2 or larger, channel-decodes the m initial transmission streams and checking errors in the m channel-decoded streams, selects, if at least two channel-decoded streams have errors among the m channel-decoded streams, a retransmission mode to be used for the at least two streams having errors in the transmitter, and transmits information including the selected retransmission mode to the transmitter.

In accordance with another aspect of exemplary embodiments of the present invention, there is provided a method for decoding a retransmission stream in a receiver of a MIMO communication system wherein the receiver receives m retransmission streams from a transmitter, m being an integer of 2 or larger, checks errors in the m retransmission streams, space-time-decodes one stream, if the one stream has errors among the m retransmission streams, and checks retransmission-related information fed back to the transmitter, if at least two streams have errors among the m streams. The retransmission-related information includes an ACK/NACK signal indicating whether initial transmission was failed or successful for initial transmission streams, retransmission mode selection information indicating a retransmission mode for retransmission of an initial transmission stream, and retransmission stream selection information indicating an initial transmission stream to be retransmitted.

In accordance with a further aspect of exemplary embodiments of the present invention, there is provided a retransmission method of a transmitter in a MIMO communication system wherein the transmitter transmits m initial transmission streams to a receiver, m being an integer of 2 or larger, receives retransmission-related information about the m streams from the receiver, and retransmits, if the retransmission-related information includes NACK information indicating initial transmission failure for at least two initial transmission streams, the at least two initial transmission streams in a retransmission mode indicated by retransmission mode information included in the retransmission-related information.

In accordance with still another aspect of exemplary embodiments of the present invention, there is provided a retransmission method of a transmitter in a MIMO communication system wherein the transmitter transmits m initial transmission streams to a receiver, m being an integer of 2 or larger, retransmits one stream to the receiver in an STC mode, upon receipt of a NACK signal indicating initial transmission failure for the one stream, and retransmits two streams to the receiver in an SM mode, upon receipt of NACK signals indicating initial transmission failure for the two streams among the m streams.

In accordance with yet another aspect of exemplary embodiments of the present invention, there is provided an apparatus for selecting a retransmission mode in a MIMO communication system wherein m receive antennas receive m initial transmission streams from a transmitter, m being an integer of 2 or larger, and a retransmission information generator channel-decodes the m initial transmission streams, checking errors in the m channel-decoded streams, selects, if at least two channel-decoded streams have errors among the m channel-decoded streams, a retransmission mode to be used for the at least two streams having errors in the transmitter, and controls the m receive antennas to transmit information indicating the selected retransmission mode to the transmitter.

In accordance with yet still another aspect of exemplary embodiments of the present invention, there is provided an apparatus for decoding a retransmission stream in a receiver of a MIMO communication system wherein a receive antenna receives m retransmission streams from a transmitter, m being an integer of 2 or larger, and a channel decoder checks errors in the m retransmission streams, space-time-decodes one stream, if the one stream has errors among the m retransmission streams, and checks retransmission-related information fed back to the transmitter, if at least two streams have errors among the m streams. The retransmission-related information includes an ACK/NACK signal indicating whether initial transmission was failed or successful for initial transmission streams, retransmission mode selection information indicating a retransmission mode for retransmission of an initial transmission stream, and retransmission stream selection information indicating an initial transmission stream to be retransmitted.

In accordance with still another aspect of exemplary embodiments of the present invention, there is provided a retransmission apparatus in a MIMO communication system wherein m transmit antennas transmit m initial transmission streams to a receiver, m being an integer of 2 or larger, and a retransmission information controller receives retransmission-related information about the m streams from the receiver and if the retransmission-related information includes NACK information indicating initial transmission failure for at least two initial transmission streams, controls the m transmit antennas to transmit the at least two initial transmission streams in a retransmission mode indicated by retransmission mode information included in the retransmission-related information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and apparatus.

Further, exemplary embodiments of the present invention propose a method and apparatus for selecting a retransmission mode adaptively according to a channel status in a MIMO communication system. That is, a retransmission scheme most suitable for correcting errors in initial transmission may vary at every retransmission and, under some circumstances, a retransmission scheme different from an initial transmission scheme can be more effective.

Accordingly, the present invention proposes "estimation-based retransmission scheme selection" as a retransmission and combining method wherein a receiver monitors the previous transmission channel environment, selects an optimum retransmission scheme, and notifies a transmitter of the selected retransmission scheme. The present invention is based on the assumption that a Spatial Multiplexing (SM) mode and an STC mode are available as retransmission schemes. In the SM mode, individual transmission antennas transmit independent information to increase data rate, whereas, in the STC mode, every transmission antenna transmits a copy of the same information to increase transmission reliability.

To be more specific, the receiver selects the SM mode at a retransmission time and notifies the transmitter of the SM mode. Then the transmitter retransmits all streams having errors in the SM mode. If the receiver selects the STC mode at a retransmission time and indicates the STC mode to the transmitter, the transmitter retransmits only part of all streams having errors in the STC mode. Despite partial transmission of the streams in the STC mode, the transmitter can correct errors in the non-retransmitted streams with use of interference cancellation.

Figure 1:
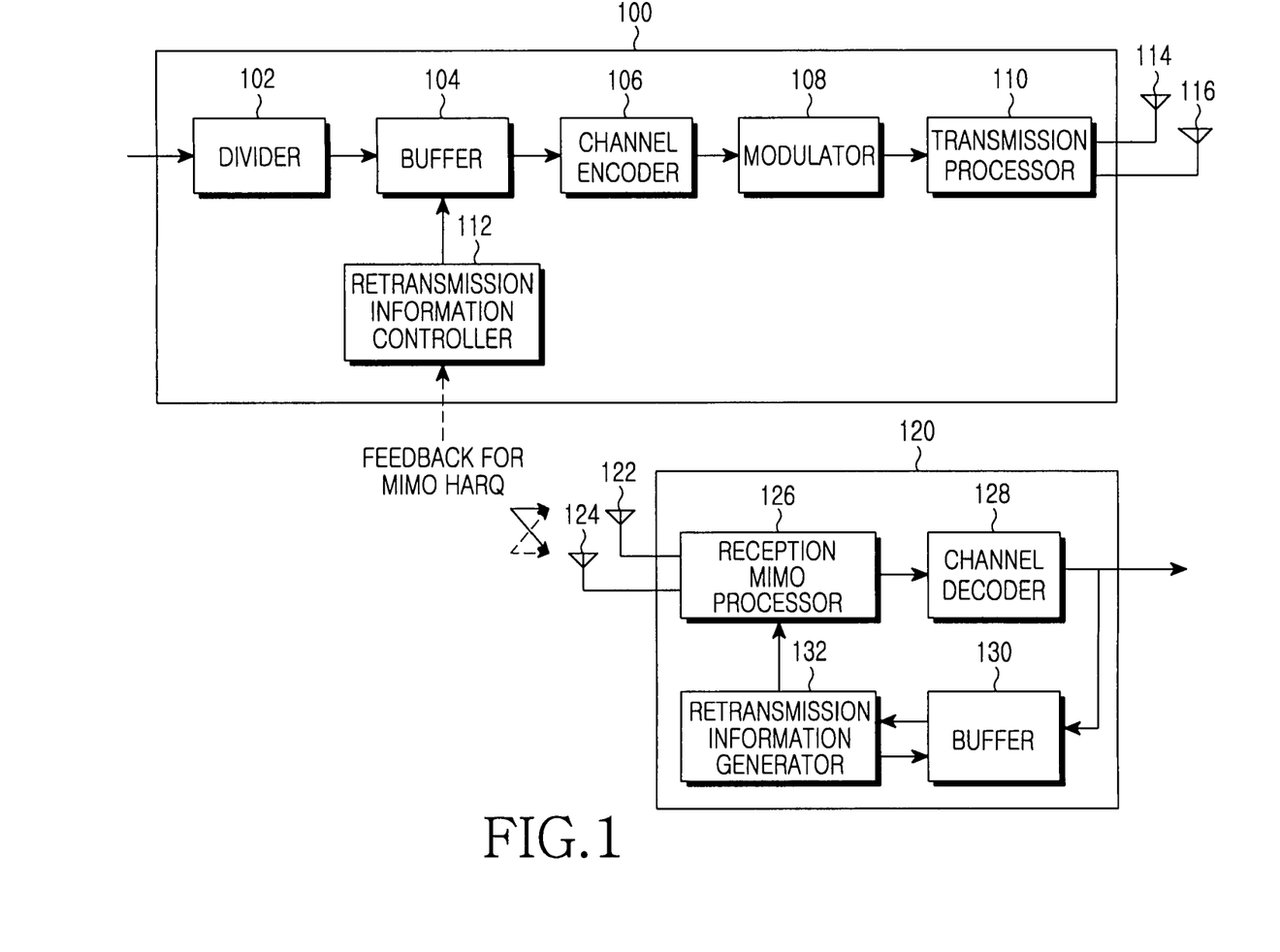
FIG. 1 is a block diagram of a transmitter and a receiver in a MIMO communication system according to an exemplary embodiment of the present invention.

FIG. 1 is a block diagram of a transmitter and a receiver in a MIMO communication system according to an exemplary embodiment of the present invention. While the transmitter and the receiver each have two antennas in the MIMO system, any other case could be used.

Referring to FIG. 1, a transmitter 100 includes a divider 102, a buffer 104, a channel encoder 106, a modulator 108, a transmission MIMO processor 110, a retransmission information controller 112, and two transmit antennas 114 and 116. A receiver 120 includes two receive antennas 122 and 124, a reception MIMO processor 126, a channel decoder 128, a buffer 130, and a retransmission information generator 132.

Upon receipt of a packet from an upper layer, the divider 102 divides the received packet into streams. The buffer 104 stores the divided streams and provides streams to the channel encoder 106 under the control of the retransmission information controller 112. The channel encoder 106 channel-encodes the received streams and the modulator 108 modulates the coded streams in a predetermined modulation scheme. The transmission MIMO processor 110 MIMO-processes the modulated streams for transmission to the transmit antennas 114 and 116. Specifically, the MIMO process is carried out as follows. If the streams are initially transmitted, the SM mode is used. If the streams are retransmitted, the retransmission information controller 112 detects a retransmission scheme in feedback retransmission-related information received from the receiver 120 and controls the buffer 104 to output the streams to the channel encoder 106 according to the retransmission scheme.

The MIMO-processed streams are transmitted to the receiver 120 through the transmit antennas 114 and 116.

Upon receipt of the streams through the receive antennas 122 and 124, the reception MIMO processor 126 MIMO-processes the streams. The channel decoder 128 channel-decodes the MIMO-processed streams. The buffer 130 stores error-having streams among the channel-decoded streams in order to perform HARQ as indicated by the retransmission information generator 132. The retransmission information generator 132 checks whether the channel-decoded streams have errors. If they have errors, the retransmission information generator 132 selects a retransmission scheme for the error-having streams and controls the buffer 130 to store the streams according to the selected retransmission scheme. The retransmission information generator 132 generates retransmission-related information indicating the selected retransmission scheme and provides it to the reception MIMO processor 126. The reception MIMO processor 126 feeds back the retransmission-related information to the transmitter 100. The retransmission-related information includes an Acknowledgment/Negative Acknowledgment (ACK/NACK) bit indicating whether the streams have been received successfully, a retransmission mode selection bit indicating the selected retransmission mode, and retransmission stream selection bits indicating a stream to be retransmitted.

Figure 2:
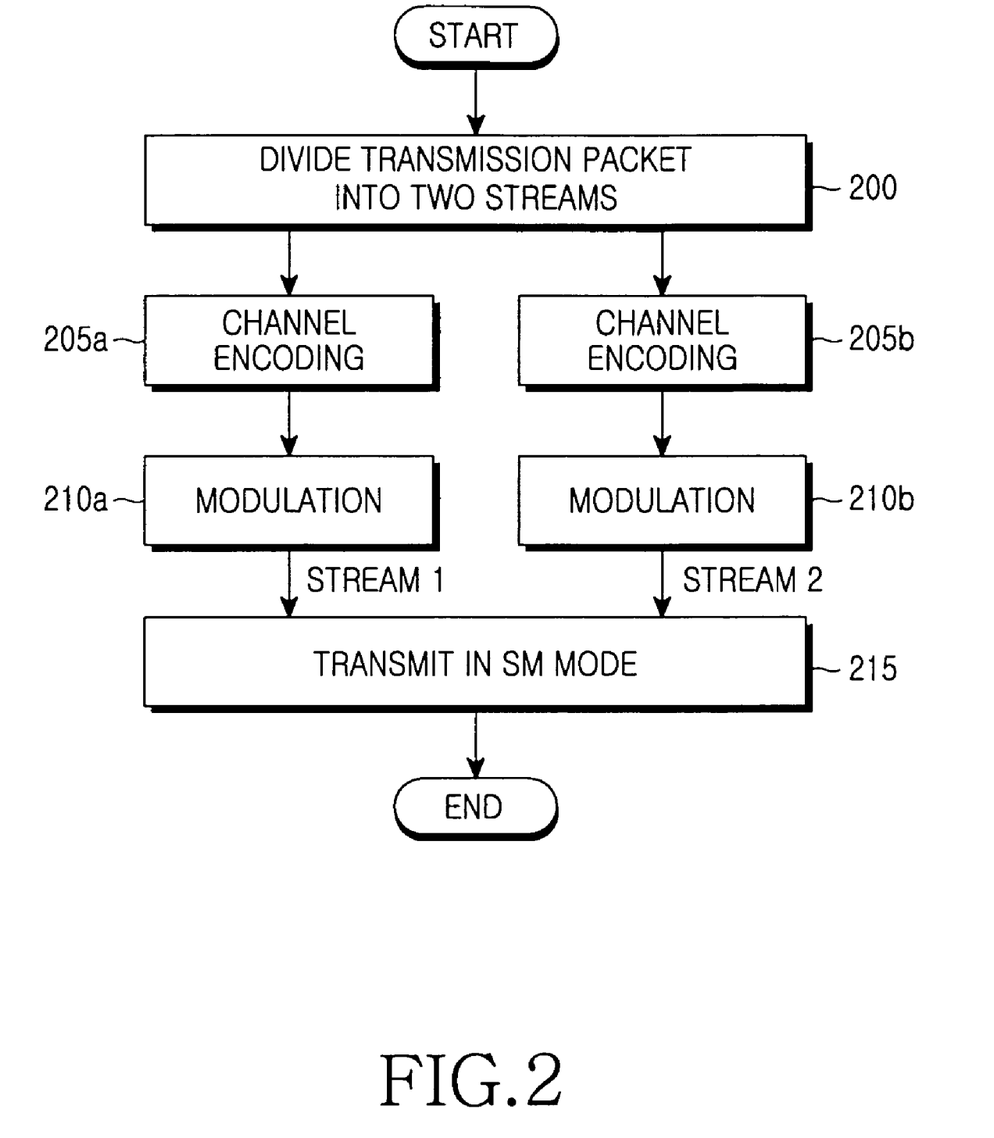
FIG. 2 is a flowchart illustrating an initial transmission operation of a transmitter 100 according to an exemplary embodiment of the present invention.

FIG. 2 is a flowchart illustrating an initial transmission operation of the transmitter 100 illustrated in FIG. 1 according to an exemplary embodiment of the present invention.

Referring to FIG. 2, upon receipt of a packet from the upper layer, the transmitter 100 divides the packet into two streams in step 200. The transmitter 100 channel-encodes the two streams in steps 205a and 205b and modulates the channel-encoded streams in a predetermined modulation scheme in steps 210a and 210b. The transmitter 100 initially transmits the modulated streams in the SM mode to the receiver 120 in step 215.

While initial transmission and retransmission mode selection for two streams are described with reference to FIGS. 3, 4 and 5, to which the present invention is not limited, it is to be clearly understood that the present invention is applicable to three or more streams.

Figure 3:
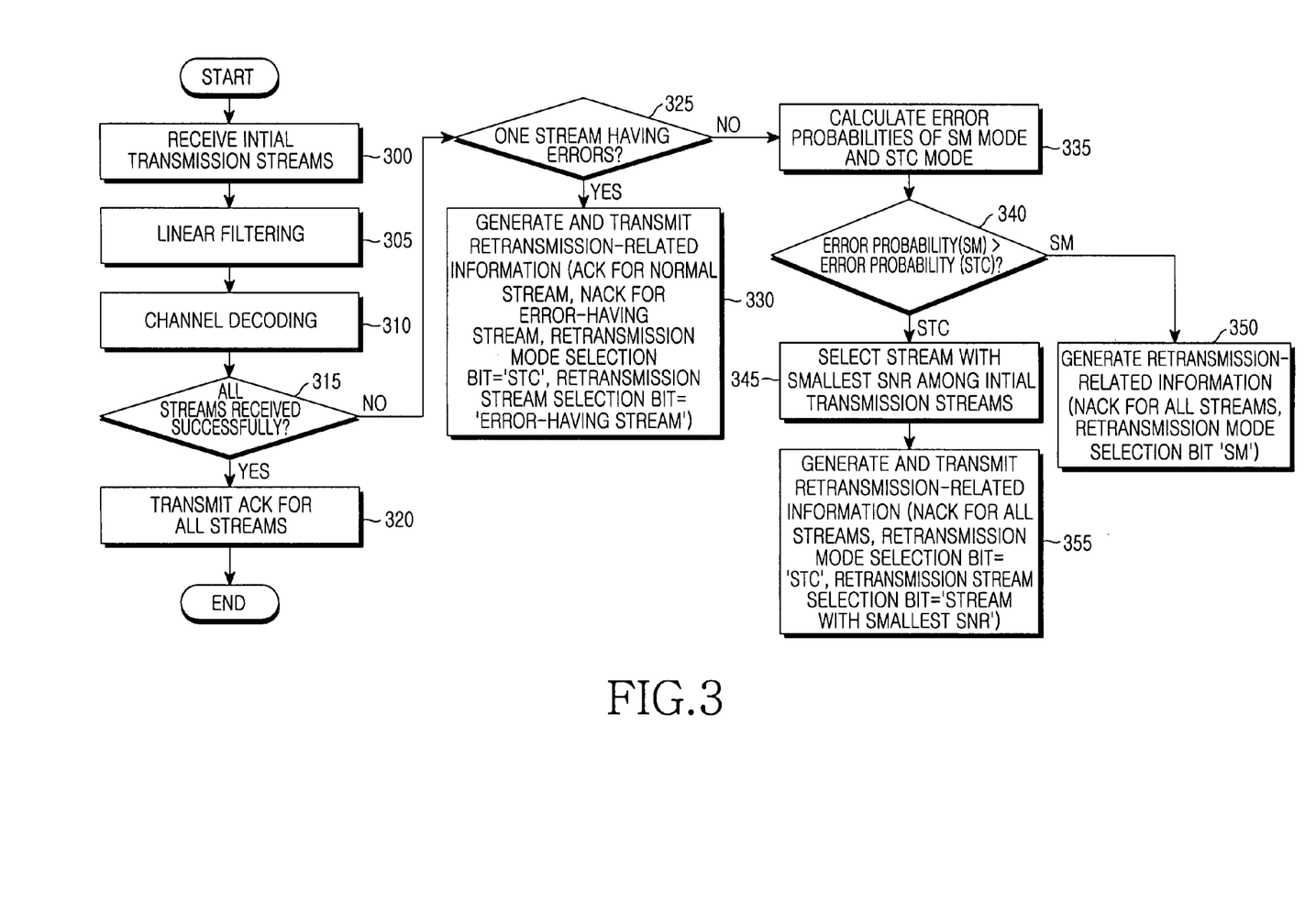
FIG. 3 is a flowchart illustrating an operation of a receiver 120, when the receiver 120 receives an initial transmission stream according to an exemplary embodiment of the present invention.

FIG. 3 is a flowchart illustrating an operation of the receiver 120 illustrated in FIG. 1 when the receiver 120 receives an initial transmission stream according to an exemplary embodiment of the present invention.

Referring to FIG. 3, the receiver 120 receives two initial transmission streams in step 300, linearly filters the two initial transmission streams in step 305, and channel-decodes them in step 310. While not shown, one successfully decoded stream between the two channel-decoded streams is encoded again and interference is cancelled from the one encoded stream due to channel effects in step 305. The interference-cancelled stream is subject to linear filtering in step 305 and decoded in step 310.

The receiver 120 checks errors in the decoded streams in step 315. If both decoded streams are normal, the receiver 120 generates ACK signals for them and transmits the ACK signals to the transmitter 100 in step 320.

However, if both decoded streams are not normal, the receiver determines whether one stream has errors in step 325. In the case of one erroneous stream, the receiver 120 generates retransmission-related information and transmits it to the transmitter 100 in step 330. The retransmission-related information includes an ACK signal for the normal stream, a NACK signal for the erroneous stream, a retransmission mode selection bit indicating the STC mode, and retransmission stream selection bits indicating the erroneous stream.

If both decoded streams have errors in step 325, the receiver 120 calculates retransmission error probabilities for the cases where the two streams are retransmitted in the SM and STC modes by Equation 1 to Equation 4 in step 335. The retransmission error probability computation will be detailed later. In step 340, the receiver 120 compares the retransmission error probability $P_{SM}$ expected when the SM mode is used with the retransmission error probability $P_{STC}$ expected when the STC mode is used.

If $P_{SM} > P_{STC}$, the receiver 120 compares the Signal-to-Noise Ratios (SNRs) of the two erroneous streams at the initial transmission and selects a stream having the smaller SNR as a retransmission stream in step 345. The receiver 120 then generates retransmission-related information and transmits it to the transmitter 100 in step 355. The retransmission-related information includes NACK signals for the initial transmission streams, a retransmission mode selection bit indicating the STC mode, and retransmission stream selection bits indicating the stream having the smaller SNR.

If $P_{SM} < P_{STC}$ in step 340, the receiver 120 generates retransmission-related information and transmits it to the transmitter 100 in step 350. The retransmission-related information includes NACK signals for the respective streams, a retransmission mode selection bit indicating the SM mode, and retransmission stream selection bits indicating the erroneous streams.

$P_{SM}$ and $P_{STC}$ are computed as follows.

First, $P_{SM}$ is calculated by Equation 1. Let the two initial transmission streams be called first and second streams, respectively.

$$P_{SM} = \quad [\text{Eqn. 1}]$$
$$2 \times \int_0^\infty P_{frame}(\beta_{(1),1} + x) P_{frame}(\beta_{(1),2} + x) \frac{2x}{\rho^2} \exp\left(-\frac{2}{\rho}x\right) dx.$$

In Equation 1, $\beta_{(1),1}$ and $\beta_{(1),2}$ denote the SNRs of the first and second streams, at the initial transmission respectively. The first and second subscripts of each of $\beta_{(1),1}$ and $\beta_{(1),2}$ denote the number of transmission occurrences and an indicator indicating the stream, respectively, $\rho$ denotes the average SNR of each antenna, and $\beta_{frame}(\ )$ denotes a function determined by modulation and coding schemes. For example, if $M_c$-Quadrature Amplitude Modulation ($M_c$-QAM) is used without channel coding, $P_{frame}(\ )$ is given as defined in Equation 2:

$$P_{frame}(x) \approx 1 - \left(1 - 4\left(1 - \frac{1}{\sqrt{M_c}}\right) Q\left(\sqrt{\frac{3x}{M_c}}\right)\right)^K. \quad [\text{Eqn. 2}]$$

In Equation 2, $K \equiv B/\log_2 M_c$ and $$Q(x) = \frac{1}{\sqrt{2\pi}} \int_x^\infty \exp(-t^2/2)\,dt$$

When $M_c$-QAM is used as the modulation scheme and convolutional coding is used, which has $a_{d_{free}}$ wrong paths having as many different bits as a free distance $d_{free}$, $P_{frame}(\ )$ is defined by Equation 3:

$$P_{frame}(x) \approx 1 - \left(1 - a_{d_{free}} \times 4\left(\frac{1}{\sqrt{M_c}} - \frac{1}{M_c}\right) Q\left(\sqrt{\frac{3xd_{free}}{M_c}}\right)\right)^K. \quad [\text{Eqn. 3}]$$

Equation 2 and Equation 3 are merely example applications for computing $P_{frame}(\ )$. Therefore, $P_{frame}(\ )$ can be computed in other various manners.

In one example, $P_{STC}$ is computed by Equation 4:

$$P_{STC} = P_{frame}(\gamma_{(1)}, m) \quad [\text{Eqn. 4}]$$

In Equation 4, $\gamma_{(1)}$,m denotes the SNR of a stream, the first subscript of $\gamma_{(1)}$,m denotes the number of transmission occurrences, and m denotes an indicator indicating a stream that will not be retransmitted. If the first stream is to be retransmitted, m=2 and if the second stream is to be retransmitted, m=1.

Figure 4:
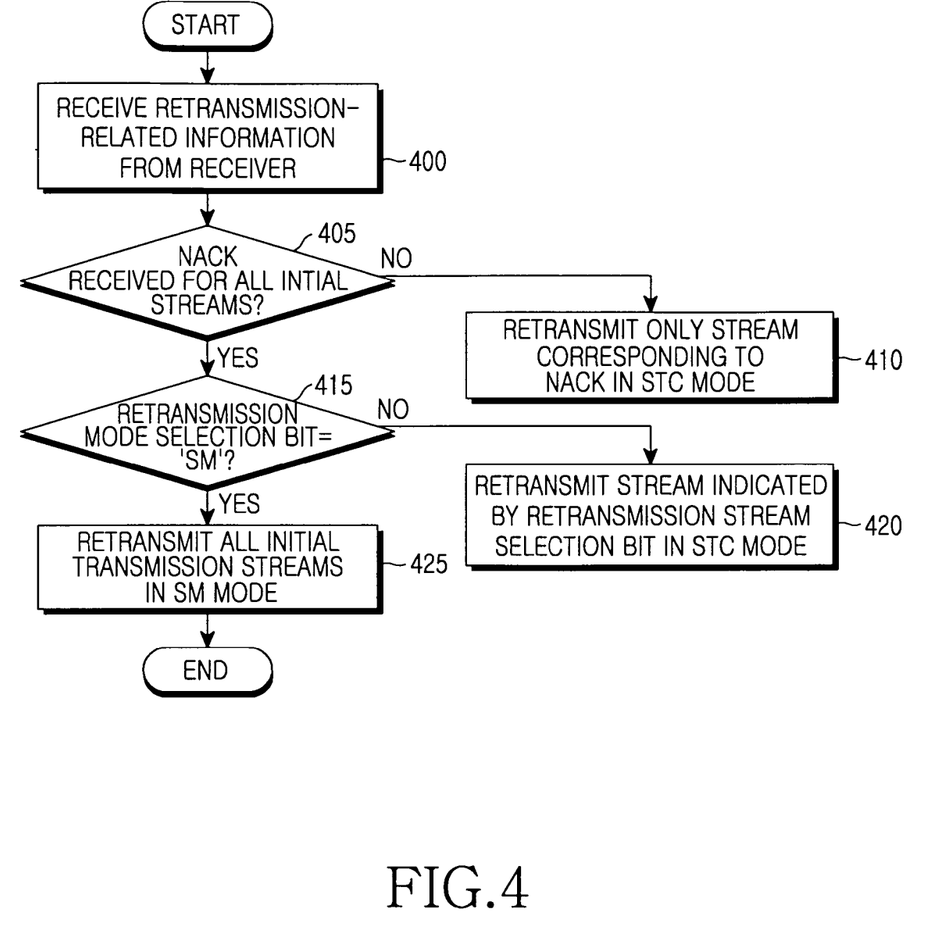
FIG. 4 is a flowchart illustrating a retransmission operation of the transmitter 100 according to an exemplary embodiment of the present invention.

FIG. 4 is a flowchart illustrating a retransmission operation of the transmitter 100 according to an exemplary embodiment of the present invention. It is assumed herein that the transmitter 100 has initially transmitted two streams in the procedure illustrated in FIG. 2.

Referring to FIG. 4, the transmitter 100 receives feedback retransmission-related information from the receiver 120 in step 400. The retransmission-related information includes at least one NACK signal for the initial transmission streams, a retransmission mode selection bit, and retransmission stream selection bits. While not shown, if ACK signals are received for all of the initial transmission streams, retransmission is not needed. Thus the transmitter 100 receives the next packet from the upper layer and initially transmits new streams.

In step 405, the transmitter 100 determines whether NACK signals have been received for both initial transmission streams. If a NACK signal has been received for one initial transmission stream, the transmitter 100 retransmits the initial transmission stream corresponding to the NACK signal in the STC mode in step 410.

If NACK signals have been received for both initial transmission streams, the transmitter 100 determines whether the retransmission mode selection bit indicates the SM mode in step 415. In the case of the SM mode, the transmitter 100 retransmits both initial transmission streams in the SM mode in step 425.

If the retransmission mode selection bit indicates the STC mode in step 415, the transmitter 100 retransmits a stream indicated by the retransmission stream selection bits in the STC mode in step 420.

Figure 5A:
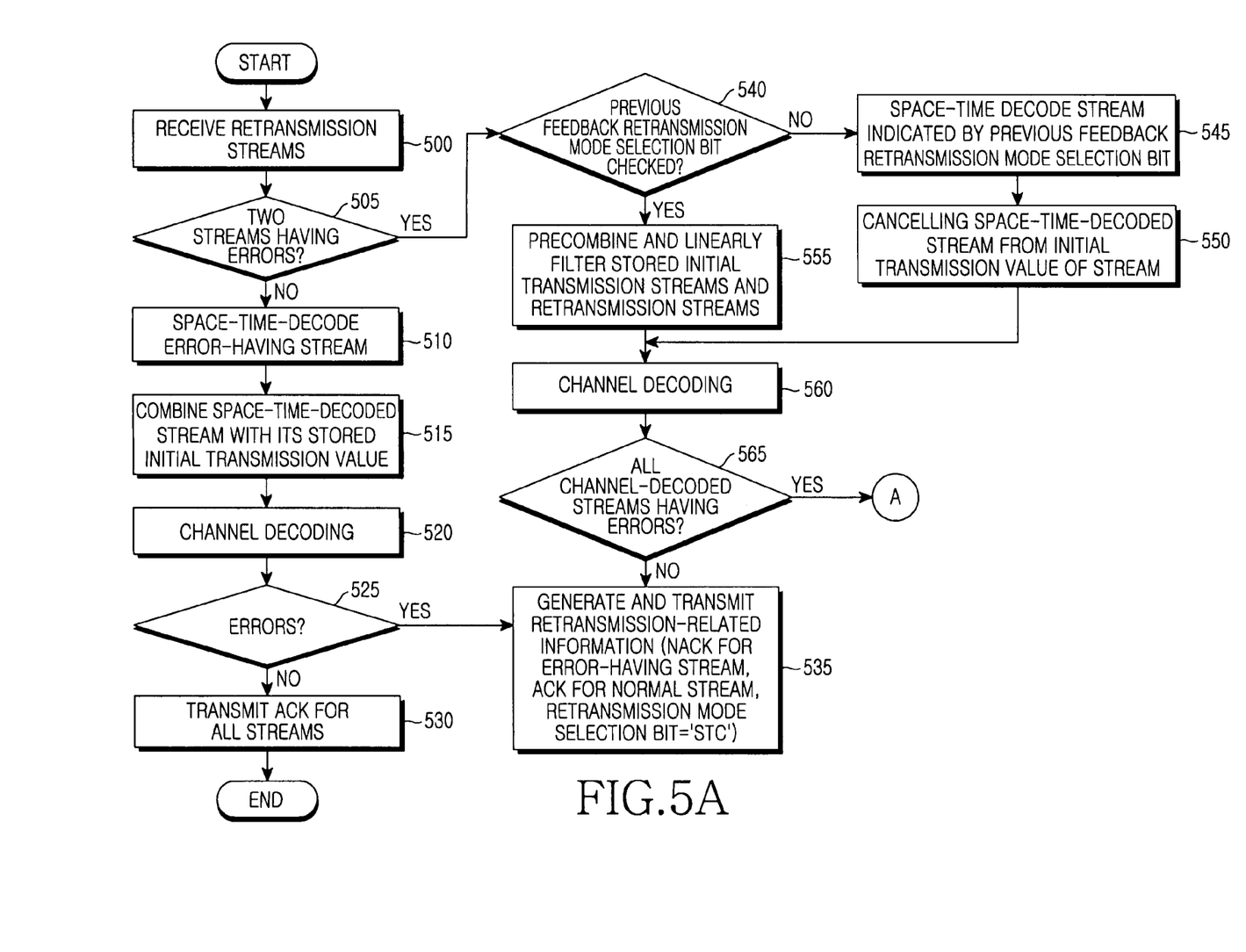
FIGS. 5A and 5B are a flowchart illustrating an operation for receiving retransmission data in the receiver 120 according to an exemplary embodiment of the present invention.
Figure 5B:
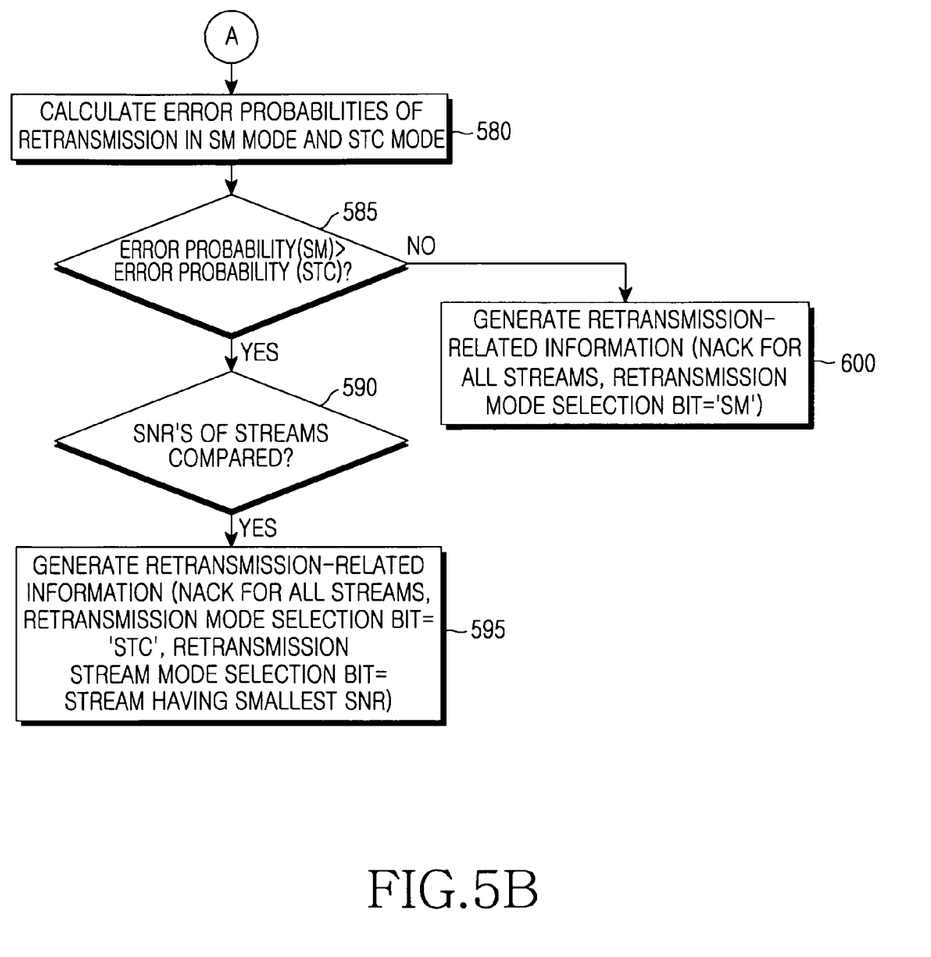

FIGS. 5A and 5B are a flowchart illustrating an operation for receiving retransmission data in the receiver 120 according to an exemplary embodiment of the present invention.

Referring to FIG. 5A, the receiver 120 receives retransmission streams from the transmitter 100 according to its feedback retransmission-related information in step 500 and determines whether both streams received at a previous transmission had errors in step 505. If one of the streams had errors, the transmitter 100 has transmitted the error-having stream by space-time coding. Therefore, the receiver 120 STC-decodes the error-having stream in step 510 and combines the STC-decoded stream with an initial transmission value of the error-having stream in step 515.

After channel decoding of the combined stream in step 520, the receiver 120 checks errors in the channel-decoded stream in step 525. If the channel-decoded stream is normal, the receiver 120 transmits ACK signals for the retransmission streams to the transmitter 100 in step 530. If the channel-decoded stream has errors in step 525, the receiver 120 generates retransmission-related information for the channel-decoded stream and transmits it to the transmitter 100 in step 535. The retransmission-related information includes a NACK signal for the channel-decoded stream, an ACK signal for the other normal stream, and a retransmission mode selection bit indicating the STC mode.

If both of the retransmission streams have errors in step 505, the receiver 120 checks the previous feedback retransmission mode selection bit in step 540. If the previous feedback retransmission mode selection bit indicates the STC mode, the receiver 120 considers that the transmitter 100 transmitted only a stream indicated by the previous feedback retransmission mode selection bit. Hence, the receiver 120 STC-decodes the stream indicated by the previous feedback retransmission mode selection bit in step 545, cancels the STC-decoded stream from an initial transmission value of the indicated stream in step 550, and goes to step 560.

If the previous retransmission mode selection bit indicates the SM mode in step 540, the receiver 120 performs pre-combining and linear filtering on all of the retransmission streams and their stored initial transmission streams in step 555 and proceeds to step 560.

After channel decoding in step 560, the receiver 120 checks errors in the channel-decoded streams in step 565. If one stream has errors, the receiver 120 returns to step 535.

If all of the channel-decoded streams have errors in step 565, the receiver 120 goes to step 580.

Referring to FIG. 5B, the receiver 120 calculates the retransmission error probabilities $P_{SM}$ and $P_{STC}$ of the SM mode and the STC mode by Equation 1 to Equation 4 in step 580.

In step 585, the receiver 120 compares $P_{SM}$ with $P_{STC}$. If $P_{SM}$ exceeds $P_{STC}$, the receiver 120 compares the SNRs of the two streams at the initial transmission and selects a stream with the smaller SNR as a stream to be retransmitted in step 590. In step 595, the receiver 120 generates retransmission-related information and transmits it to the transmitter 100. That is, the retransmission-related information includes NACK signals for the initial transmission streams, a retransmission mode selection bit indicating the STC mode, and retransmission stream selection bits indicating the stream with the smaller SNR.

If $P_{SM}$ is below $P_{STC}$, the receiver 120 generates retransmission-related information and transmits it to the transmitter 100 in step 600. The retransmission-related information includes NACK signals for the initial transmission streams, a retransmission mode selection bit indicating the SM mode, and retransmission stream selection bits indicating the error-having stream.

When a further retransmission needed as a result of performing the procedure illustrated in FIGS. 5A and 5B, the procedure is repeated.

It can be further contemplated as another exemplary embodiment of the present invention that the receiver 120 does not transmit retransmission-related information to the transmitter 100 and the transmitter 100 selects a transmission mode for a stream upon receipt of an ACK/NACK signal for the stream from the receiver 120.

The receiver 120 transmits an ACK signal selectively according to the decoding result of two initial transmission or retransmission streams from the transmitter 100. That is, if the decoding result indicates that the two streams are normal, the receiver 120 transmits ACK signals for the respective streams to the transmitter 100.

If the decoding result indicates one erroneous stream, the receiver 120 transmits a NACK signal for the erroneous stream and an ACK signal for the other normal stream to the transmitter 100.

If the decoding result indicates that both of the streams have errors, the receiver 120 selects a retransmission mode according to Equation 1 to Equation 4. When selecting the SM mode, the receiver 120 transmits NACK signals for all of the erroneous streams. If the receiver 120 selects the STC mode, it compares the SNRs of the erroneous streams. The receiver 120 transmits a NACK signal for a stream with the smaller SNR and an ACK signal for the other stream.

Upon receipt of ACK signals for both of the streams, the transmitter 100 initially transmits new streams out of a new packet.

Upon receipt of a NACK signal for one of the two streams, the transmitter 100 retransmits the stream corresponding to the NACK signal through the two transmit antennas in the STC mode.

Upon receipt of NACK signals for both of the streams, the transmitter 100 retransmits the two streams in the SM mode.

Figure 6:
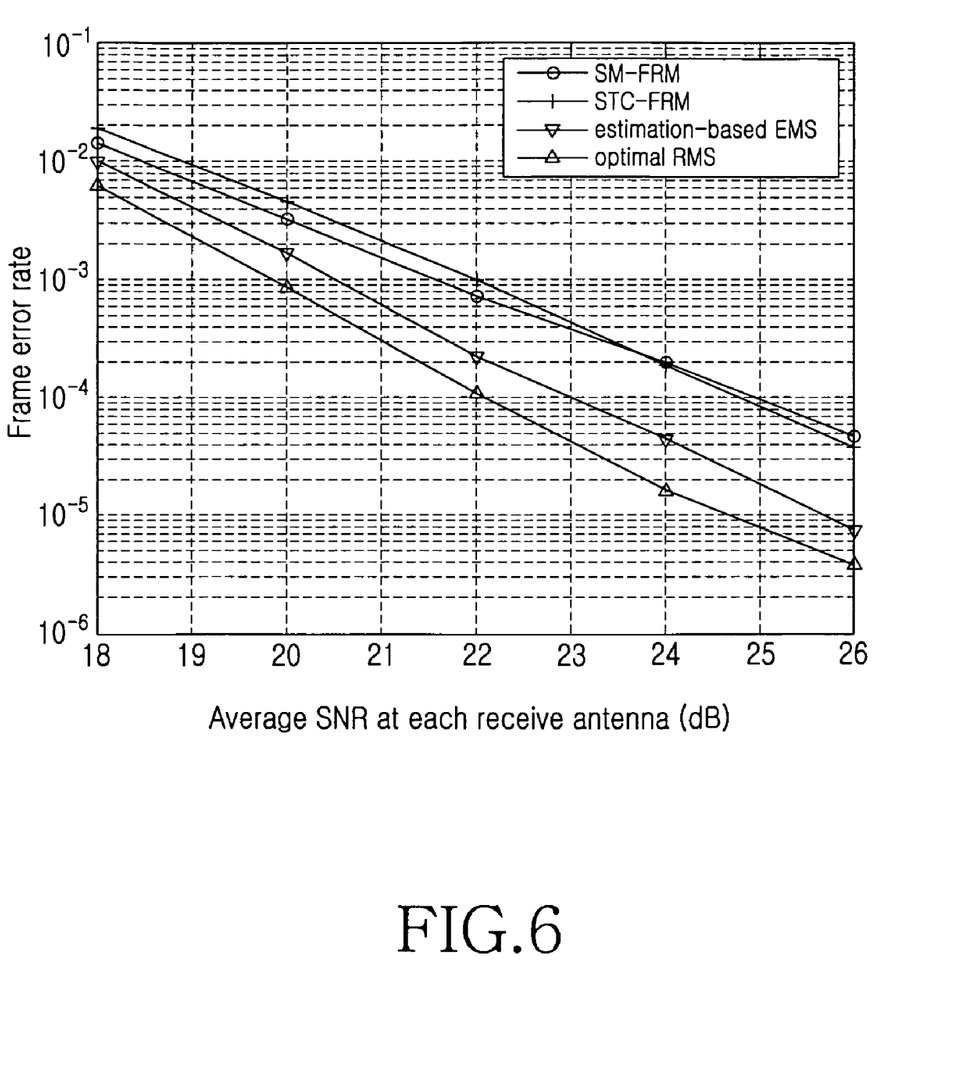
FIG. 6 is a graph illustrating effects of the exemplary embodiments of the present invention.

FIG. 6 is a graph illustrating effects of the exemplary embodiments of the present invention.

Referring to FIG. 6, Frame Error Rates (FERs) are measured after a retransmission, while an average SNR is changed under 16-QAM. No channel coding is used and each frame is 40 bits long. Herein, the terms "frame" and "stream" are interchangeably used in the same sense.

That is, the graph illustrates the rates of frames having errors with respect to total transmitted frames, after one retransmission. Compared to Spatial Multiplexing-Fixed Retransmission Mode (SM-FRM) or STC-FRM, the proposed estimation-based RMS offers a 2-dB SNR gain at a target FER of $10^{-4}$. This SNR gain becomes more apparent as the SNR increases.

As is apparent from the above description, the exemplary embodiments of the present invention can improve the error correction capability of HARQ for a fast fading channel by adaptively changing a retransmission mode according to a channel status in a MIMO communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for selecting a retransmission mode in a receiver of a Multiple Input Multiple Output (MIMO) communication system, comprising:
   receiving m initial transmission streams from a transmitter, m being an integer of 2 or larger;
   channel-decoding the m initial transmission streams and checking errors in the m channel-decoded streams;
   selecting, if at least two channel-decoded streams have errors among the m channel-decoded streams, a retransmission mode to be used for the at least two streams having errors in the transmitter; and
   transmitting information including the selected retransmission mode to the transmitter.

2. The method of claim 1, wherein the retransmission mode selection comprises:
   calculating a first error probability for a case of using a Spatial Multiplexing (SM) mode as the retransmission mode and a second error probability for a case of using a Space Time Code (STC) mode as the retransmission mode;
   comparing the first error probability with the second error probability; and
   selecting the SM mode as the retransmission mode, if the first error probability is less than the second error probability.

3. The method of claim 2, further comprising transmitting Negative Acknowledgment signals indicating initial transmission failures for the at least two streams having errors to the transmitter.

4. The method of claim 2, wherein the retransmission mode selection further comprises selecting the STC mode as the retransmission mode, if the second error probability is less than the first error probability.

5. The method of claim 4, further comprising checking initial transmission Signal-to-Noise Ratios (SNRs) of the at least two streams having errors and selecting a stream having a smallest SNR.

6. The method of claim 5, further comprising:
   transmitting retransmission stream information indicating the selected stream to be retransmitted to the transmitter; and
   transmitting Negative Acknowledgment (NACK) signals indicating initial transmission failures for the at least two streams having errors to the transmitter.

7. The method of claim 5, further comprising:
   transmitting a NACK signal indicating initial transmission failure for the selected stream to the transmitter; and
   transmitting an Acknowledgment (ACK) signal indicating initial transmission success for the other stream except the selected stream among for the at least two streams having errors.

8. The method of claim 1, further comprising:
   selecting, if one of the m streams has errors, an STC mode as a retransmission mode for the stream having an error; and transmitting a NACK signal indicating initial transmission failure for the stream having the error and ACK signals indicating initial transmission success for (m−1) normal streams to the transmitter.

9. A method for decoding a retransmission stream in a receiver of a Multiple Input Multiple Output (MIMO) communication system, comprising:
receiving m retransmission streams from a transmitter, m being an integer of 2 or larger;
checking errors in the m retransmission streams;
space-time-decoding one stream, if the one stream has an error among the m retransmission streams; and
checking retransmission-related information fed back to the transmitter, if at least two streams have errors among the m streams,
wherein the retransmission-related information includes an Acknowledgment/Negative Acknowledgment (ACK/NACK) signal indicating whether initial transmission was failed or successful for initial transmission streams, retransmission mode selection information indicating a retransmission mode for retransmission of an initial transmission stream, and retransmission stream selection information indicating an initial transmission stream to be retransmitted.

10. The method of claim 9, wherein the checking comprises:
space-time-decoding a stream indicated by the retransmission stream selection information among the at least two streams having errors, if the retransmission mode selection information indicates a Space Time Code mode; and
performing pre-combining and linear filtering on the at least two streams having errors and stored initial transmission streams of the at least two streams having errors, if the retransmission mode selection information indicates a Spatial Multiplexing mode.

11. A retransmission method of a transmitter in a Multiple Input Multiple Output (MIMO) communication system, comprising:
transmitting m initial transmission streams to a receiver, m being an integer of 2 or larger;
receiving retransmission-related information about the m streams from the receiver; and
retransmitting, if the retransmission-related information includes Negative Acknowledgment information indicating initial transmission failure for at least two initial transmission streams, the at least two initial transmission streams in a retransmission mode indicated by retransmission mode information included in the retransmission-related information.

12. The retransmission method of claim 11, wherein the retransmission mode is a Spatial Multiplexing mode.

13. The retransmission method of claim 11, wherein the retransmission comprises retransmitting a stream indicated by retransmission stream information included in the retransmission-related information, if the retransmission mode information indicates a Space Time Code mode, wherein the stream indicated by the retransmission stream information has a minimum Signal-to-Noise Ratio among the at least two initial transmission streams having errors.

14. A retransmission method of a transmitter in a Multiple Input Multiple Output (MIMO) communication system, comprising:
transmitting m initial transmission streams to a receiver, m being an integer of 2 or larger;
retransmitting one stream to the receiver in a Space Time Code mode, upon receipt of a Negative Acknowledgment (NACK) signal indicating initial transmission failure for the one stream; and
retransmitting two streams to the receiver in a Spatial Multiplexing mode, upon receipt of (NACK) signals indicating initial transmission failure for the two streams among the m streams.

15. An apparatus for selecting configured to select a retransmission mode in a Multiple Input Multiple Output (MIMO) communication system, the apparatus comprising:
m receive antennas configured to receive m initial transmission streams from a transmitter, m being an integer of 2 or larger; and
a retransmission information generator configured to channel-decode the m initial transmission streams, to check errors in the m channel-decoded streams, to select, if at least two channel-decoded streams have errors among the m channel-decoded streams, a retransmission mode to be used for the at least two streams having errors in the transmitter, and to control the m receive antennas to transmit information indicating the selected retransmission mode to the transmitter.

16. The apparatus of claim 15, wherein the retransmission information generator is configured to calculate a first error probability for a case of using a Spatial Multiplexing mode as the retransmission mode and a second error probability for a case of using a Space Time Code mode as the retransmission mode, to compare the first error probability with the second error probability, and to select the SM mode as the retransmission mode, if the first error probability is less than the second error probability.

17. The apparatus of claim 16, wherein the retransmission information generator to control the m receive antennas to transmit (NACK) signals indicating initial transmission failures for the at least two streams having errors to the transmitter.

18. The apparatus of claim 16, wherein the retransmission information generator is configured to select the STC mode as the retransmission mode, if the second error probability is less than the first error probability.

19. The apparatus of claim 18, wherein the retransmission information generator is configured to check initial transmission Signal-to-Noise Ratios of the at least two streams having errors and to select a stream having a smallest SNR.

20. The apparatus of claim 19, wherein the retransmission information generator is configured to transmit retransmission stream information indicating the selected stream to be retransmitted to the transmitter, and to transmit NACK signals indicating initial transmission failures for the at least two streams having errors to the transmitter.

21. The apparatus of claim 19, wherein the retransmission information generator is configured to transmit a NACK signal indicating initial transmission failure for the selected stream to the transmitter, and to transmit an Acknowledgment (ACK) signal indicating initial transmission success for the other stream except the selected stream among for the at least two streams having errors.

22. The apparatus of claim 15, wherein if one of the m streams has errors, the retransmission information generator is configured to select an STC mode as a retransmission mode for the stream having an error, and to transmit a NACK signal indicating initial transmission failure for the stream having the error and ACK signals indicating initial transmission success for (m−1) normal streams to the transmitter.

23. An apparatus configured to decode a retransmission stream in a receiver of a Multiple Input Multiple Output (MIMO) communication system, the apparatus comprising:
- a receive antenna configured to receive m retransmission streams from a transmitter, m being an integer of 2 or larger; and
- a channel decoder configured to check errors in the m retransmission streams, to space time decode, if the one stream has errors among the m retransmission streams, and to check retransmission-related information fed back to the transmitter, if at least two streams have errors among the m streams,
- wherein the retransmission-related information includes an Acknowledgment/Negative Acknowledgment signal indicating whether initial transmission was failed or successful for initial transmission streams, retransmission mode selection information indicating a retransmission mode for retransmission of an initial transmission stream, and retransmission stream selection information indicating an initial transmission stream to be retransmitted.

24. The apparatus of claim 23, wherein the channel decoder is configured to space-time-decode a stream indicated by the retransmission stream selection information among the at least two streams having errors, if the retransmission mode selection information indicates a Space Time Code mode, and to perform pre-combining and linear filtering on the at least two streams having errors and stored initial transmission streams of the at least two streams having errors, if the retransmission mode selection information indicates a Spatial Multiplexing mode.

25. A retransmission apparatus in a Multiple Input Multiple Output (MIMO) communication system, the retransmission apparatus comprising:
- m transmit antennas configured to transmit m initial transmission streams to a receiver, m being an integer of 2 or larger; and
- a retransmission information controller configured to receive retransmission-related information about the m streams from the receiver and if the retransmission-related information includes Negative Acknowledgment (NACK) information indicating initial transmission failure for at least two initial transmission streams, to control the m transmit antennas to transmit the at least two initial transmission streams in a retransmission mode indicated by retransmission mode information included in the retransmission-related information.

26. The retransmission apparatus of claim 25, wherein the retransmission mode is a Spatial Multiplexing mode.

27. The retransmission apparatus of claim 25, wherein if the retransmission mode information indicates a Space Time Code mode, the retransmission information controller is configured to control the m transmit antennas to retransmit a stream indicated by retransmission stream information included in the retransmission-related information, wherein the stream indicated by the retransmission stream information has a minimum Signal-to-Noise Ratio among the at least two initial transmission streams having errors.

* * * * *